United States Patent [19]
Takeuchi et al.

[11] Patent Number: 6,144,817
[45] Date of Patent: Nov. 7, 2000

[54] IMAGE FORMING APPARATUS UTILIZING INTERMEDIATE TRANSFER MEMBER

[75] Inventors: Akihiko Takeuchi, Susono; Toshiaki Miyashiro, Shizuoka-ken, both of Japan

[73] Assignee: Canon Kabushiki Kaisha, Tokyo, Japan

[21] Appl. No.: 09/426,730

[22] Filed: Oct. 26, 1999

[30] Foreign Application Priority Data

Oct. 28, 1998 [JP] Japan .................................. 10-307081

[51] Int. Cl.⁷ ........................... G03G 15/01; G03G 15/04
[52] U.S. Cl. ........................... 399/51; 347/115; 399/178; 399/302; 430/47; 430/54
[58] Field of Search .................... 399/51, 177, 178, 399/296, 297, 302; 347/115; 430/42, 44, 47, 54

[56] References Cited

U.S. PATENT DOCUMENTS

| | | | |
|---|---|---|---|
| 4,256,820 | 3/1981 | Landa | 430/54 |
| 4,655,579 | 4/1987 | Adachi et al. | 399/178 |
| 5,250,994 | 10/1993 | Ito et al. | 355/271 |
| 5,783,343 | 7/1998 | Tombs et al. | 430/47 |

*Primary Examiner*—Joan Pendegrass
*Attorney, Agent, or Firm*—Fitzpatrick, Cella, Harper & Scinto

[57] ABSTRACT

An image forming apparatus includes a photosensitive member, charging means, exposure means, developing means, and an image holding member, where the exposure means is adapted, in exposing the photosensitive member according to an image signal, to expose a pixel not exposed in accordance with the image signal with a faint light.

3 Claims, 7 Drawing Sheets

FIG. 7A

MAIN SCANNING DIRECTION →

↓ SECONDARY SCANNING DIRECTION

| 128 | 128 | 128 | 128 | 128 | ... | ... |
|-----|-----|-----|-----|-----|-----|-----|
| 128 | 128 | 128 | 128 | 128 | ... | ... |
| 128 | 128 | 128 | 128 | 128 | ... | ... |
| 128 | 128 | 128 | 128 | 128 | ... | ... |
| 128 | 128 | 128 | 128 | 128 | ... | ... |

FIG. 7B

| 0   | 75  | 180 | 0   | 0   | ... | ... |
|-----|-----|-----|-----|-----|-----|-----|
| 180 | 255 | 255 | 75  | 180 | ... | ... |
| 75  | 255 | 255 | 180 | 75  | ... | ... |
| 0   | 180 | 75  | 0   | 0   | ... | ... |
| 0   | 75  | 180 | 0   | 0   | ... | ... |

IMAGE FORMING APPARATUS UTILIZING INTERMEDIATE TRANSFER MEMBER

BACKGROUND OF THE INVENTION

1. Field of the Invention

The present invention relates to an image forming apparatus such as a copying apparatus or a printer, and more particularly to an image forming apparatus provided with an image holding member called an intermediate transfer member.

2. Description of the Related Art

In the electrophotographic color image forming apparatus, there is already known a configuration having an intermediate transfer member in addition to the photosensitive drum. In such a configuration, a primary transfer operation of transferring the toner image, formed on the photosensitive drum, onto the intermediate transfer member is repeated plural times to superpose the toner images of plural colors on such intermediate transfer member. The toner images of plural colors then are collectively transferred onto a transfer material such as paper ("secondary transfer" operation).

FIG. 8 shows an example of the conventional color image forming apparatus utilizing the intermediate transfer member.

The color image forming apparatus is provided with a photosensitive drum 101 which is rotatably supported and is rendered rotatable in a direction R1. Around the photosensitive drum 101, there are provided developing units of different colors, namely four developing units 105, 106, 107, 108 respectively containing developers (toners) of black (K), magenta (M), cyan (C) and yellow (Y). These developing units 105 to 108 are in turn brought into contact with the photosensitive drum 101 by unrepresented contacting means, for developing the electrostatic latent images formed on the photosensitive drum 101.

The photosensitive drum 101 is surfacially uniformly charged with a charger 102, and an electrostatic latent image is formed by scanning with a scanning beam (laser beam) 104 from a laser exposure optical system 103. Portions exposed by the laser beam within the electrostatic latent image are selectively developed with the above-mentioned developing unit 105 to 108 and visualized as a toner image. The toner images formed on the photosensitive drum 101 are transferred, by a primary transfer roller 110, onto an intermediate transfer belt 109 constituting the intermediate transfer member ("primary transfer" operation).

The above-described steps of latent image formation, image development and primary transfer are repeated for each of the four colors of yellow, cyan, magenta and black, whereby a color image consisting of four superposed toner images is formed on the intermediate transfer belt 109. Then such toner images of four colors are transferred in the block to a transfer material P, which is pinched and conveyed by a secondary transfer roller 111 and the intermediate transfer belt 109 ("secondary transfer" operation).

In the following there will be further explained the primary transfer and the secondary transfer mentioned above.

Where the photosensitive drum 101 is composed of OPC (organic photo-semiconductor), for example, having negative charging characteristics, the developing units 105 to 108 utilize negatively charged toners to develop the areas exposed to the laser beam 104. Consequently, at the developing operation, the primary transfer roller 110 is given a positive transfer bias by a bias power source 120 constituting the primary transfer means together with the primary transfer roller 110.

The intermediate transfer belt 109 is composed, for example, of an endless resinous film of PVDF (polyvinylidene fluoride), nylon, PET (polyethylene terephthalate) or polycarbonate of a thickness of 100 to 200 $\mu$m and a volume resistivity adjusted if necessary to $10^{11}$ to $10^{16}$ $\Omega$cm, and is supported by a rear roller 112, a driving roller 115 and a tension roller 116.

The intermediate transfer belt 109 consisting of such thin film forms a large electrostatic capacitance of several hundred to several thousand pF at the primary transfer nip portion N1, thereby realizing a stable transfer current.

In another configuration, the intermediate transfer belt 109 is composed, as shown in FIG. 9A, of a base layer 109a and a surfacial layer 109b, in which at least the base layer 109a is composed of an elastic member (hardness of 60° to 90° according to JIS-A measurement) of a thickness of 0.5 to 2 mm.

Such configuration is effective in avoiding hollow images (hollow characters) which are encountered in the aforementioned resinous belt. The intermediate transfer belt 109 with a high surface hardness tends to form a hollow images in the toner image on the intermediate transfer belt 109, but the elastic member 109a reduces the surface hardness of the intermediate transfer belt 109, thereby preventing the formation of hollow images in the toner image.

On the other hand, the toner image supported on the intermediate transfer belt 109 is conveyed over plural turns in the surfacially supported state, and, if the electrostatic attractive force of the toner to the intermediate transfer belt 109 is weak, the yellow, magenta, cyan and black toner images superposed in succession on the surface of the intermediate transfer belt may be distorted when the intermediate transfer belt is bent or the surface thereof repeats extension and contraction over the rollers 112, 115, 116 supporting the intermediate transfer belt.

In particular, if the intermediate transfer belt 109 includes the elastic member, when the intermediate transfer belt 109 is subjected to extension and contraction (in a belt portion, the outer belt surface is extended while the inner belt surface contracts) for example over the roller 115, the magenta toner tM deposited on the yellow toner tY on the intermediate transfer belt 109 receives electric repulsion from the yellow toner tY while being subjected to the shock of bending, extension and contraction of the belt 109, thereby being scattered the magenta toner tM, as shown in FIG. 9B.

Naturally such scattering phenomenon occurs less if the volume resistivity is low, even in the resinous belt not including an elastic member.

Such toner scattering phenomenon becomes conspicuous when the toner image of each color contains a large amount of toner and the toners of plural colors are superposed to form a full-color image on the intermediate transfer belt. This is because, when toner images are superposed on the intermediate transfer belt, the toner image present in the upper layer (toner image transferred last) is easily scattered.

In order to avoid such toner scattering, the present applicant has found a method of increasing the volume resistivity of the resin in the aforementioned resinous belt or of the surfacial layer in the belt including the elastic member, as shown in FIG. 9A thereby forming a potential wall as shown in FIGS. 9C and 9D.

In the following there will be explained the transfer to the transfer material by the secondary transfer roller 111 (secondary transfer).

The secondary transfer of the toner image onto the transfer material P is executed by the secondary transfer means consisting of the secondary transfer roller 111, the rear roller 112 and the bias power source 121. A secondary transfer nip portion N2 is formed by pinching the intermediate transfer belt 109 with the rear roller 112 of a low resistance, positioned inside the belt 109 and grounded or given a suitable bias as a counter electrode and the secondary transfer roller 111 of a low resistance positioned outside the intermediate transfer belt 109. The secondary transfer is executed by applying a positive transfer bias by the bias power source 121 to the secondary transfer roller 111 and causing the secondary transfer roller 111 to abut on the rear surface of the transfer material P.

On the photosensitive drum 101 after the primary transfer, the toner remaining thereafter is removed and recovered by a cleaner 119. The retentive charge then is eliminated by an exposure unit 117 and the drum is used again for the next image formation. Also the surface of the intermediate transfer belt 109 after the secondary transfer is subjected to the removal of toner remaining after the secondary transfer by a cleaner 113, and the removal of the retentive charge by a charge eliminating charger 114, which can be composed for example of an AC corona charger or a roller charger of contact type.

At the primary transfer operation in the above-described image forming apparatus, there may result a defective transfer or a defective image depending on the magnitude of the transfer potential contrast between the positive bias applied to the primary transfer roller 110 and the negative potential of the photosensitive drum 101. With respect to the defective transfer, there exists an optimum transfer contrast according to the magnitude of the negative charge of the toner. The transfer efficiency is lowered when the transfer potential contrast at the primary transfer unit is too larger or too small. However, when resistance of the intermediate transfer belt 109 is elevated in order to suppress the aforementioned scattering of the toner, it is necessary to increase the transfer bias in order to maintain the transfer efficiency, and the increased transfer potential contrast causes discharge in the air in the vicinity of the transfer nip portion, thereby distorting the image.

When the discharge in air occurs in the toner at the execution of the primary transfer, the image distortion appears as a distortion in the toner image on the intermediate transfer member at the primary transfer. In case the discharge in air occurs when a non-image area of a color is superposed on the toner image previously transferred onto the intermediate transfer member, a charge pattern is formed thereon according to the pattern of discharge, and induces distortion of the toner at the secondary transfer onto the transfer sheet after the completion of the primary transfers.

The discharge in air occurs more easily in the latter case of transfer of the non-image area of the next or subsequent color onto the color already formed on the intermediate transfer member, than in the former case of distortion in the primary transferred color itself. This is because the image formation is executed by reversal development, thereby increasing the potential in the non-image area of the photosensitive member in the negative direction (namely dark potential) and accordingly increasing the transfer potential contrast.

Besides, as the resistance of the intermediate transfer belt 109 increases, the optimum point of the transfer efficiency tends to go beyond the range without the above-mentioned discharge in air, so that it is extremely difficult to find a point of simultaneously satisfying the toner scattering, the transfer efficiency and the image distortion (particularly the latter one appearing at the secondary transfer).

SUMMARY OF THE INVENTION

In consideration of the foregoing, an object of the present invention is to provide an image forming apparatus capable of outputting a satisfactory image without toner scattering.

Another object of the present invention is to provide an image forming apparatus capable of suppressing discharge between the photosensitive member and the intermediate transfer member.

Still another object of the present invention is to provide an image forming apparatus comprising a photosensitive member; charging means for charging the photosensitive member; exposure means for exposing the photosensitive member with light corresponding to an image signal; development means for developing a latent image formed on the photosensitive member with toner; and an image bearing member for temporarily holding or supporting a toner image transferred from the photosensitive member, the image bearing member being adapted to receive toner images formed on the photosensitive member in succession, thereby holding toner images of plural colors at the same time; wherein the exposure means is adapted, in the exposure of the photosensitive member according to the image signal, to execute exposure with a faint or weak light even on the pixel for which the image signal is absent.

Still other objects of the present invention, and the features thereof, will become fully apparent from the following detailed description which is to be taken in conjunction with the attached drawings.

BRIEF DESCRIPTION OF THE DRAWINGS

FIGS. 7A and 7B are views explaining a third embodiment;

DETAILED DESCRIPTION OF THE PREFERRED EMBODIMENTS (First Embodiment)

Figure 1:
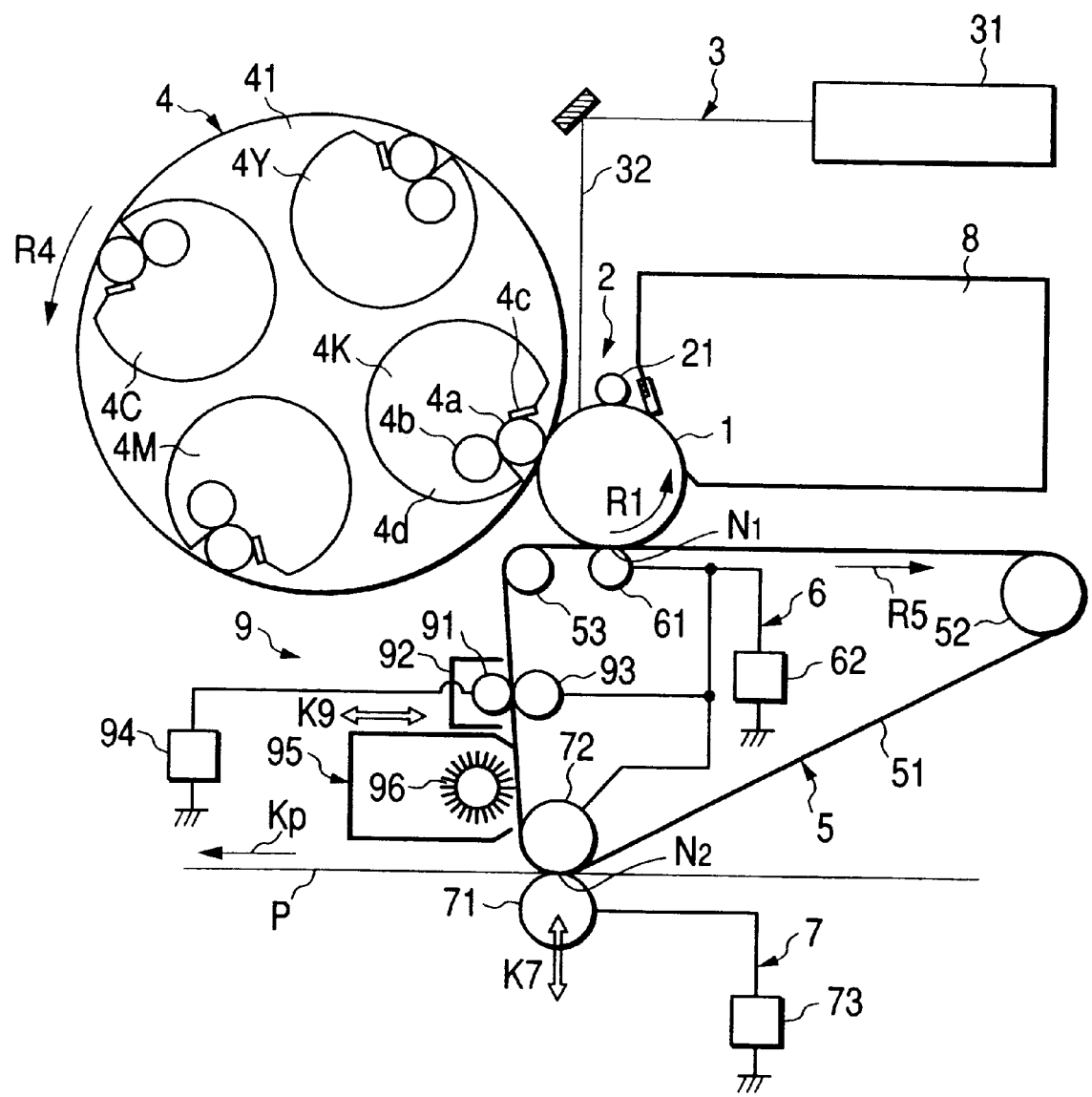
FIG. 1 is a view showing the configuration of an apparatus of the present invention.

FIG. 1 is a schematic view showing the configuration of an embodiment of the image forming apparatus of the present invention.

This image forming apparatus is a full-color image forming apparatus employing four colors, and is provided with a photosensitive drum 1; charging means 2; exposure means 3; developing means 4; an intermediate transfer belt 51 of an image holding member 5; first transfer means 6 and second transfer means 7.

The principal steps of image formation consist of forming a toner image on the photosensitive drum 1 by means of the image forming means constituted by the charging means 2, exposure means 3 and developing means 4, transferring the toner image onto the intermediate transfer belt 51 by the first transfer means 6, and then transferring the toner image of the intermediate transfer belt onto a transfer material P such as paper by the second transfer means.

The photosensitive drum 1 is composed of an aluminum cylindrical substrate and a photosensitive layer covering the surface thereof and composed for example of OPC (organic photo-semiconductor) and is rotated in a direction R1 by unrepresented drive means.

The charging means 2 is composed of a charging roller 21 maintained in contact with the photosensitive drum 1, and an unrepresented power source for applying a charging bias to the charging roller. In the present embodiment, the charging roller 21 receiving the charging bias from the charging power source charges the surface of the photosensitive drum 1 at a negative uniform potential.

The exposure means 3 is provided with a laser optical system 31, and exposes the surface of the photosensitive drum 1 by scanning it with a laser beam 32 corresponding to the image information, thereby eliminating the charge in the exposed portion and forming an electrostatic latent image on the surface of the photosensitive drum 1.

The developing means 4 is composed of a rotary member 41 rotatable in a direction R4, and four developing units 4K, 4Y, 4M, 4C mounted thereon and respectively containing toners of black (K), yellow (Y), magenta (M) and cyan (C). These developing units 4K to 4C are positioned in a developing position opposed to the photosensitive drum 1 by the rotation of the rotary member 41, thereby being used for developing an electrostatic latent image on the photosensitive drum 1 (in FIG. 1, the black developing unit 4K is disposed at the developing position to be used for developing).

These developing units 4K to 4C are constructed in the same manner. As an example, the black developing unit 4K is composed of a developing container 4d, containing negatively charged one-component non-magnetic toner and provided with a rotatable metal developing sleeve 4a, a coating roller 4b for coating toner on the surface thereof, and an elastic blade 4c (composed for example of urethane rubber or silicone rubber) for regulating the toner layer thickness on the developing sleeve 4a.

The developing unit 4K serves to provide the non-magnetic toner with a triboelectricity (triboelectric charge), to coat such toner uniformly on the developing sleeve 4a, to maintain the developing sleeve 4a at a distance of about 300 μm from the photosensitive drum 1 and to apply a DC developing bias to maintain the sleeve at a relative negative potential in superposition with an AC bias, thereby depositing the black toner onto the electrostatic latent image (formed by lowering the charged potential using the laser beam) on the photosensitive drum, thereby achieving reversal by by jumping development method. The latent image is rendered visible as a black toner image by this developing process.

The second image bearing member 5 is principally composed of the aforementioned intermediate transfer belt 51, which is an endless belt provided with an elastic base layer (elastic layer) is supported by a driving roller 52, a tension roller (driven roller) 53 and a secondary transfer counter roller 72, and is rotated in a direction R5. The intermediate transfer belt 51 is pinched between the photosensitive drum 1 at the surface (external surface) side and the primary transfer roller 61 at the rear surface (internal surface) side, and a first transfer nip portion (first transfer portion) N1 a stripe shape is formed between the intermediate transfer belt 51 and the photosensitive drum 1, along the generatrix of the surface thereof.

Figure 2:
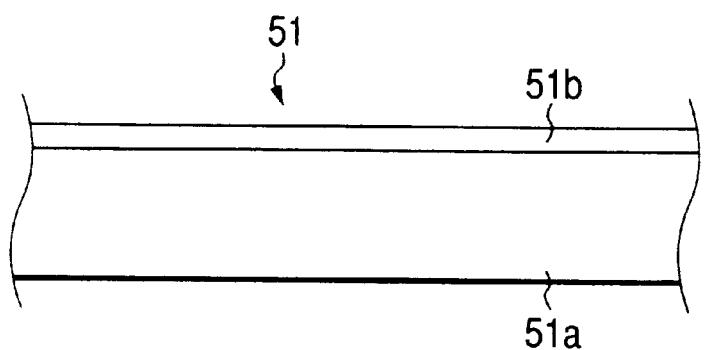
FIG. 2 is a cross-sectional view of the intermediate transfer belt employed in the apparatus shown in FIG. 1.

In more detail, the intermediate transfer belt 51 is composed, as shown in FIG. 2, of an elastic base layer (lower layer) 51a and a surface layer (coated layer) 51b provided thereon. The base layer 51a preferably has a thickness of 0.5 to 2 mm and a volume resistivity of $10^2$ to $10^8$ Ωcm.

In the present embodiment, the base layer 51a is composed an elastic member such as NBR (nitrile rubber) or EPDM (ethylene-propylene rubber) having a hardness of about 60° by the JIS-A measuring method, of which volume resistivity is adjusted to about $1 \times 10^4$ Ωcm by the addition of carbon, titanium oxide or tin oxide and is seamless formed into a cylinder of a thickness of 1 mm, a width of 220 mm and a peripheral length of 140π mm.

The base layer 51a having a high strength, with little elongation or contraction, can be obtained, for example, by sandwiching reinforcing yarns between two extrusion molded rubber sheets and vulcanizing thus formed composite.

The surface layer 51b of high resistance, to be formed on the base layer 51a, is composed of a urethane binder in which a releasing agent such as teflon is dispersed, and is coated so as to obtain a thickness of about 50 μm. The coating can be achieved for example by spray coating, dipping etc. The urethane material constituting the binder is selected so as to have a volume resistivity of $10^{10}$ to $10^{16}$ Ωcm.

The volume resistivity of the surface layer 51b is measured with a specimen formed by coating a conductive plate of a predetermined size, such as of aluminum, with the material of the surface layer 51b. The specimen is pinched in the high resistance meter 8340A manufactured by Advantest Corporation (probe electrode diameter 50 mm; guard electrode inner diameter 70 mm/outer diameter 80 mm; counter electrode based on the JISK6911), then the current is measured under the application of a voltage of 100 V and the volume resistivity is determined as that of the surface layer 51b.

The first transfer means 6 is provided with the primary transfer roller 61 maintained in contact with the rear surface of the intermediate transfer belt 51 in a position opposed to the photosensitive drum 1, and a primary transfer bias power source 62 for applying the primary transfer bias thereto. The black toner image formed on the photosensitive drum 1 is transferred onto the intermediate transfer belt 51, under the application of the primary transfer bias of +300 to +500 V to the primary transfer roller 61 from the primary transfer bias power source 62.

The photosensitive drum 1, after the primary transfer is subjected to the removal of toner remaining on the surface after the primary transfer by the cleaner 8, and then is used for a next sequential magenta image formation.

The image forming process consisting of the above-described charging, exposure, development, primary transfer and cleaning is repeated for each of other three colors of magenta, cyan and yellow, whereby the toner images of all four colors are formed in superposition on the intermediate transfer belt 51.

The primary transfer bias is elevated in succession from the first color to the fourth color, for example +300, +600, +700 and +800 V respectively for black (first color), magenta (second color), cyan (third color) and yellow (fourth color).

The second transfer means 7 is provided with the secondary transfer roller 71 positioned at the surface side of the intermediate transfer belt 51, and the secondary transfer counter roller 72 positioned at the rear surface side, and these rollers 71, 72 pinch the intermediate transfer belt 51 therebetween to form a secondary transfer nip portion N2 (second transfer position) having a strip shape between the secondary transfer roller 71 and the intermediate transfer belt 51.

The secondary transfer roller 71 is rendered movable in a direction K7, and is connected to a secondary transfer bias power source 73 for applying a secondary transfer bias thereto. The secondary transfer counter roller 72 is maintained in an electrically floating state. The toner images of four colors formed on the intermediate transfer belt 51 are collectively transferred onto a transfer material P, such as paper, under the application of a secondary transfer bias from the secondary transfer bias power source 73 to the secondary transfer roller 71 (secondary transfer).

After the secondary transfer, the intermediate transfer belt 51 is subjected to removal of toner remaining on the surface by cleaning means 95 including a fur brush 96 (or a blade), and to the removal of the retentive charge by the charge eliminating means 9.

The charge eliminating means 9 is provided with a charge eliminating roller 91 provided in a housing 92 movable in a direction K9, and an auxiliary roller 93 which is positioned opposed to the charge eliminating roller 91 across the intermediate transfer belt 51. Toner remaining after the secondary transfer and retentive charge are eliminated from the surface of the intermediate transfer belt 51 by moving the housing of the charge eliminating means 93 in a direction K9 together with the cleaning means 95, then pinching the intermediate transfer belt 51 between the charge eliminating roller 91 and the auxiliary roller 93 and applying a predetermined bias voltage from the bias power source 94, whereby initialization is achieved.

In the following there will be given a more detailed description on the second transfer means 7 and the charge eliminating means 9.

The secondary transfer roller 71 in the secondary transfer means 7 is composed of a foamed EPDM rubber roller having a hardness of about 40° (measured by Ascar C method) and a volume resistivity of $10^4$ Ωcm. There may also be used urethane rubber, chloroprene rubber or NBR having a low resistivity. The secondary transfer bias power source 73 is adjusted so as to have a transfer current of about 10 μA when the paper is passed, under the application of a voltage of about +1000 to +2000 V.

In the charge eliminating means, the material of the charge eliminating roller 91 is the same as that of the charging roller 21. The charging roller 31 is used to execute known contact charging, and is obtained by forming, on the elastic conductive rubber of a thickness of about 3 mm, an intermediate resistance layer having a thickness of 100 to 200 μm and a volume resistivity of about $10^6$ Ωcm and forming thereon a sticking preventing layer (for example composed of nylon resin layer) having a thickness of several tens of microns. The charge eliminating voltage is composed of an AC voltage having a peak-to-peak voltage Vpp of about 3 kV, superposed with a DC voltage of about +100 to +1000 V, supplied from the bias power source 94, and the auxiliary roller 93 in the counter position is maintained at a potential the same as that of the primary transfer roller 61.

The transfer material P, having received by secondary transfer the toner images of four colors using the secondary transfer means 7, is subjected to the application of heat and pressure by a fixing unit (not shown), in order to fix the toner images, and is discharged into the main body of the image forming apparatus.

In the above-described image forming process, the process speed Vp is set at 10.0 cm/sec, and the transfer material P is conveyed in a direction Kp by transfer material conveying means (not shown).

Figure 3:
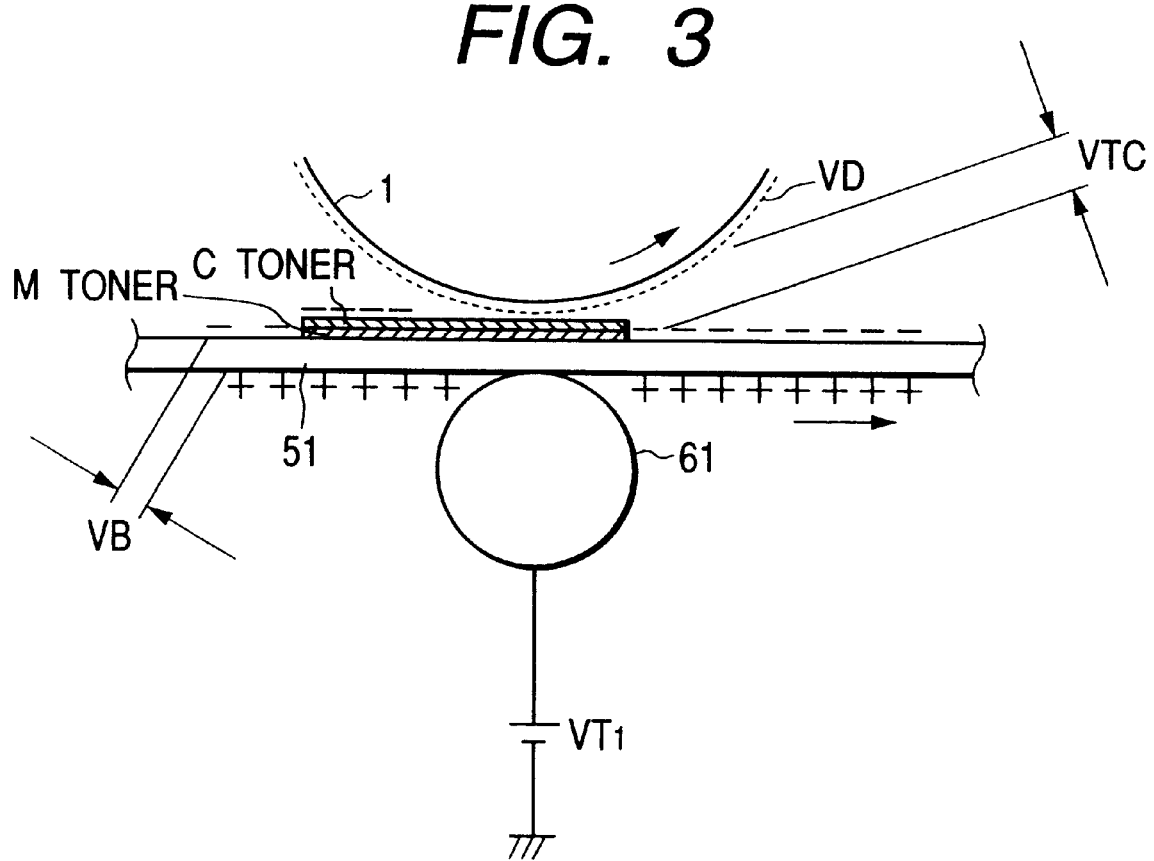
FIG. 3 is a view explaining the image distortion in the primary transfer area.

In the following there will be compared the method embodying the present invention and a conventional example, where the primary transfers are executed in the order of BK, M, C and Y as in the above-described apparatus. As an example, when forming a blue dot in the object pixel in the conventional method, the laser exposures corresponding to the BK and Y image signals are not executed, but those corresponding to the M and C image signals alone are executed and the M and C images are in succession superposed on the intermediate transfer member 51 to form an image having blue color. Consequently, at the BK and Y exposures, the photosensitive member 1 is brought into contact with the intermediate transfer member 51 in a state where the background (dark portion) potential is formed on the photosensitive member. As a result, as shown in FIG. 3, at the transfer of the Y background area, a strong transfer contrast $VTC=VT_1-V_D-V_B$ is added to the M and C toners already present on the intermediate member 51.

Here, $VT_1$ is the primary transfer bias, $V_D$ is the dark potential of the photosensitive member 1, and $V_B$ is a potential accumulated on the high-resistance intermediate member 51 through the injection, discharge, toner exchange, etc., with the photosensitive member 1 at the primary transfer.

In the present embodiment these values are $VT_1=+800$ V, $V_D=-600$ V and $V_B$ is about 200 V.

Figure 4:
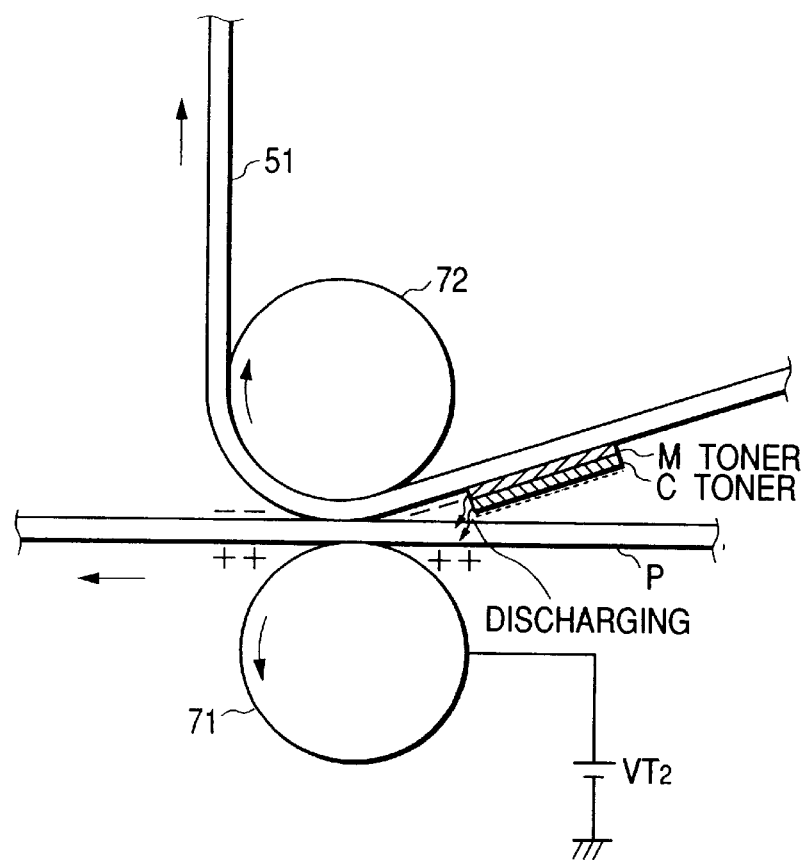
FIG. 4 is a view explaining the image distortion in the secondary transfer area.

As a result, VTC becomes as large as about 1200 V, thus inducing discharge in the M, C image areas at the primary transfer, and the pattern of such discharge induces discharge again with the secondary transfer voltage $VT_2$, as shown in FIG. 4, thereby distorting the image at the image transfer onto the transfer sheet.

The transfer contrast VTC at the primary transfer of an M or C image prior to that of the Y image is represented by:

$$VTC=VT_1-V_L-V_B$$

wherein $V_L$ is the light potential formed by irradiating the photosensitive member with the laser beam and is about −150 V in a solid image and about −300 V in a halftone image, so that VTC becomes about 750 V. Consequently VTC is sufficiently smaller in comparison with the aforementioned case of Y background potential $V_D$, so that the discharge pattern inducing the image distortion is not formed at the primary transfer of the M and C toner images.

In the following there will be explained the method of the present invention.

In the conventional case, the background potential $V_D$ at the transfer of the Y background area is as large as about −600 V, so that the transfer contrast $VTC=VT_1-V_D-V_B$ becomes large and induces discharge. In contrast, in the present embodiment, within the Y background area, the area (pixel) where the M or C toner image is already present is exposed with a weak laser beam at the formation of the Y latent image, thereby reducing $V_D$ to about −450 to −500 V, and thus decreasing VTC to a magnitude not inducing discharge. In this operation, the value $V_D$ is maintained close to the developing threshold value so as not to cause development with the toner, thereby avoiding any influence on the developed image.

Figure 5:
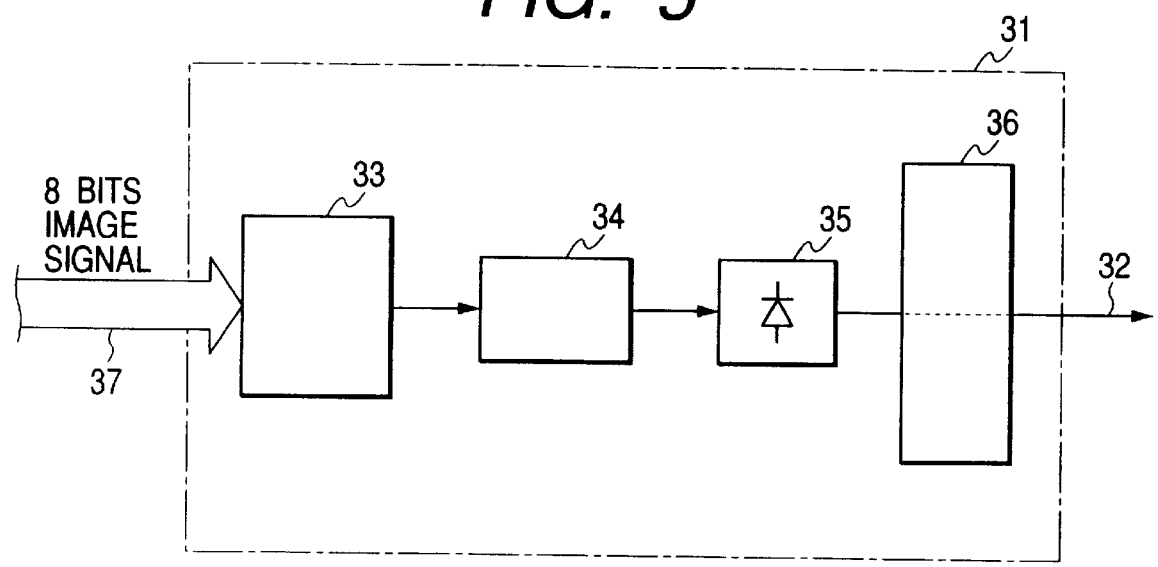
FIG. 5 is a block diagram showing the configuration of a laser optical system.

FIG. 5 shows a configuration for executing weak exposure with the laser optical system 31.

Referring to FIG. 5, the image signal 37 supplied from a controller is a multi-value signal (0 to 255) of 8 bits or 256 levels, and the laser beam is turned off when this signal level is 0, is completely turned on when this signal level is 255 and has an intermediate value when this signal is in a range of 1 to 254. This signal is converted by a frequency modulation circuit 33 into a time-sequential signal, which is used for the pulse width modulation of each dot pulse of a resolution of 600 dot/inch. This signal drives a laser driver 34 to activate a laser diode 35. The emitted laser beam 32 is guided by a correction optical system 36 including a polygon mirror and scans the photosensitive member 1. The frequency modulation circuit may be separated from the laser driver and provided in the controller.

The intensity levels of the laser beam 32 will be explained with reference to a bit map of 600 dot/inch shown in FIGS. 6A to 6C.

Figure 6A:
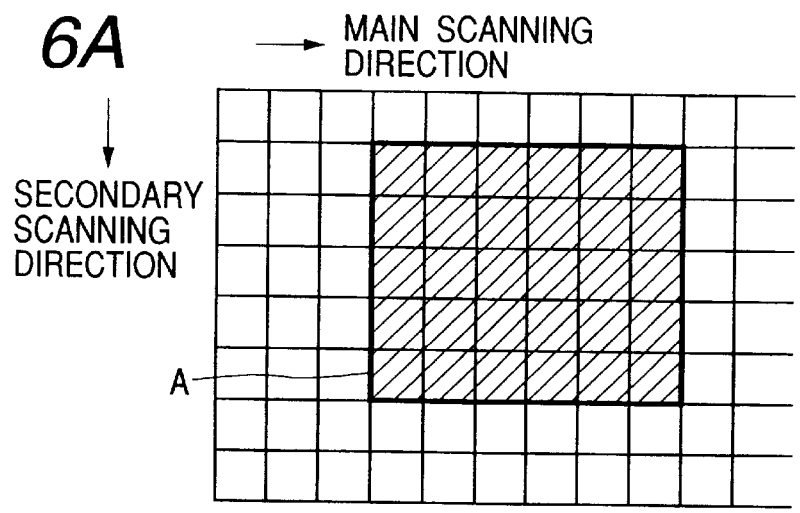
FIGS. 6A, 6B and 6C are views explaining a first embodiment.
Figure 6B:
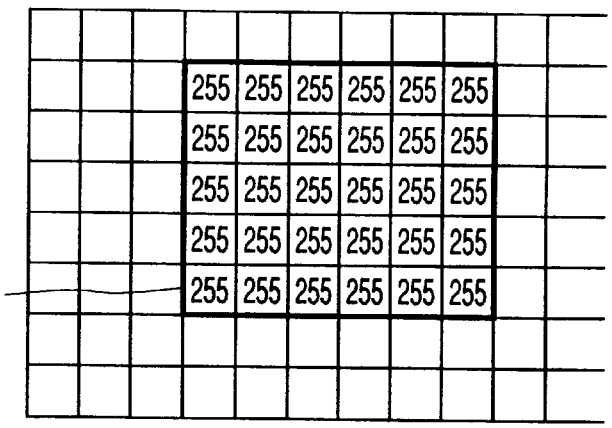

FIG. 6A shows an area A of recording M and C images in superposed state to form a blue image. As shown in FIG. 6B, the M and C bit maps for example have a value 255 (full turn-on of the laser) corresponding to such area A.

Figure 6C:
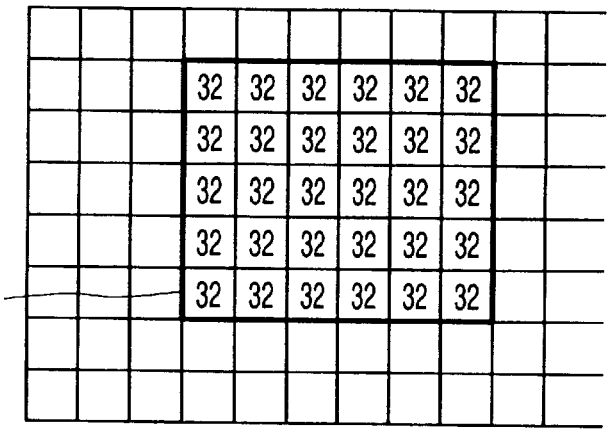
Figure 8:
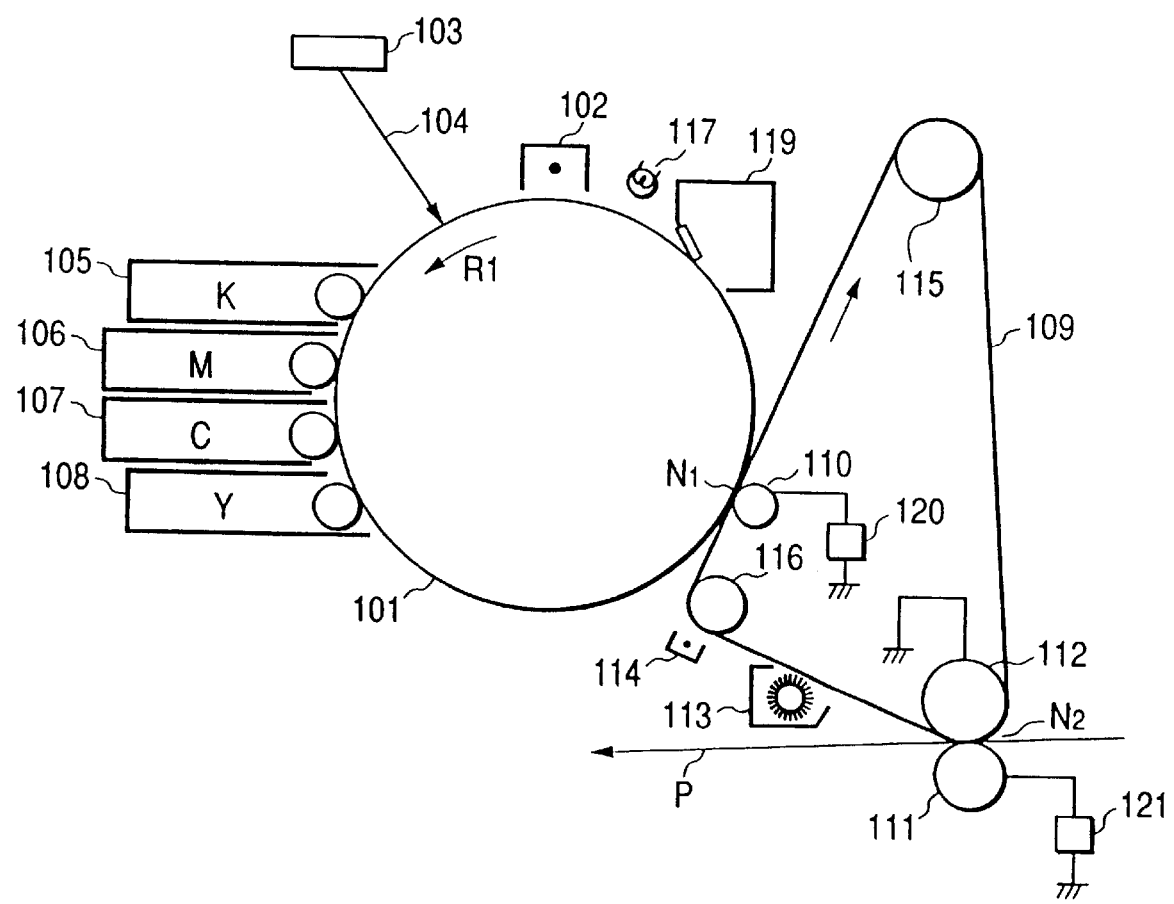
FIG. 8 is a constructional view of a conventional apparatus.
Figure 9A:
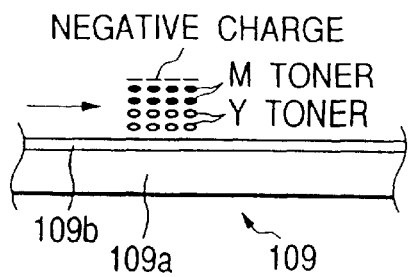
FIGS. 9A, 9B, 9C and 9D are views explaining toner scattering at the image transfer operation.
Figure 9B:
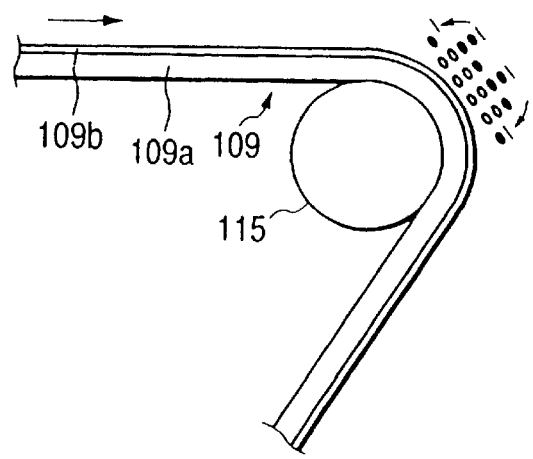
Figure 9C:
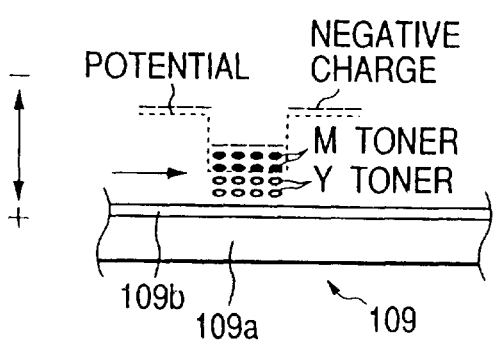
Figure 9D:
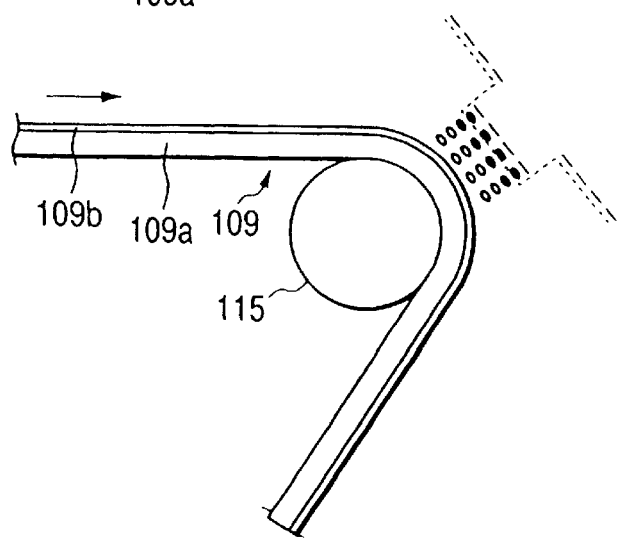

On the other hand, in the Y image without image formation in this area A, a value 32 is recorded therein as shown in FIG. 6C, so that the laser beam is irradiated for each pixel at a level of about 32/255. On the other hand, in the area not containing the M or C image, outside the area A, the Y image has a value 0 so that laser beam irradiation is not executed.

The above-described method reduces $V_D$ from −600 V without the exposure to −480 V with the weak exposure as explained in the foregoing, thereby avoiding discharge at the primary transfer and the resulting distortion in the M and C images. Still, the potential after the weak exposure is maintained slightly smaller than the developing threshold value for the Y image, so that there is no influence on the M and C images. Also in the present embodiment, in the completely white background area (other than the area A in FIG. 6A) where M and C (also BK) images are absent, weak exposure is not executed at the Y image formation, so that the image quality of such white background area is deteriorated even when background fog of the Y toner is elevated (naturally not noticeable in the presence of the M, C toners) by the weak exposure.

In the present embodiment, there has been explained a case of executing weak Y exposure for forming a blue (M+C) image, but the present embodiment can be similarly applied also in other cases. More specifically, in the present embodiment, in an area where the image is formed with at least one of BK, M, C and Y colors, weak exposure can be executed for all other colors that do not form the image in such area. For example, in the case of forming a blue image, weak exposure can be executed for BK in addition to Y. For forming a red image, weak exposure can be executed for C and BK, and, for forming a green image, weak exposure can be executed for M and BK. Also, for forming a single-colored image of M, C, Y or BK, weak exposure can be executed for the respectively unused three colors (for example BK, C and Y in the case of forming an M image). The bit map for controlling the exposure, including such weak exposure, can be prepared by a controller (not shown) according to a predetermined algorithm.

Also in the foregoing embodiment, there has been explained the discharge induced at the background transfer of the Y image after the M, C image formations in the case of forming a blue image, but a similar discharge is induced for example at the background transfer of the C image between the M and Y image formations, or at the background transfer of the M image prior to the C and Y image formations, leading to image distortion at the secondary transfer. Consequently the present invention is effective regardless of the order of the primary transfers. Also in the foregoing first embodiment, the image formations are executed in the order of BK, M, C and Y, but it is naturally applicable in any other order of image formations.

In the conventional method, jumping development may result in a phenomenon that the width of each image pattern is made slightly smaller by the edge effect when stripe patterns of different colors, for example M and C, are present in mutually adjacent manner, thus forming a gap (called white gap) between such stripe patterns. It is however found that the foregoing first embodiment has an additional effect of reducing the background potential outside the pattern by weak exposure, thereby weakening the edge effect and relaxing the decrease of the width of the stripe pattern, whereby the white gap becomes less conspicuous.

(Second Embodiment)

In the foregoing first embodiment, there has been explained a method of executing a same weak exposure for each color not used in the image formation, regardless of the order of primary transfers. However, the transfer contrast $VTC=VT_1-V_D-V_B$, determining the generation of discharge at the primary transfer, varies according to the magnitude of the primary transfer voltage $VT_1$. On the other hand, the primary transfer voltage $VT_1$ varies depending on the toner amount present on the intermediate member 51 and the magnitude of the potential $V_B$ across the intermediate belt, formed by the charge accumulated on the intermediate member 51 by the repetition of the primary transfers.

More specifically, the primary transfer voltage $VT_1$ can be relatively small for the first color where the toner by the preceding transfer is not present and $V_B$ is not yet formed, and should be selected largest for the fourth color where the toners of three colors may be already present and $V_B$ should be largest by the preceding charge accumulations. In the present embodiment, $VT_1$ is elevated in succession as +300, +600, +700 and +800 V, as explained in the foregoing, from the first color to the fourth color.

Stated differently, at a later transfer of a color, there are more easily encountered discharge at the background transfer of such color and the resulting image distortion. Consequently it is preferable to vary the amount of weak exposure for the background area of the color not used for image formation, so as to be smaller for the color used in an earlier transfer and larger for the color used in a later transfer.

As an example, when executing the primary transfers in the order of BK, M, C and Y, the image data for executing the weak exposure is selected as BK=0 (without weak exposure), M=24, C=28 and Y=32 (with respect to full exposure=255), whereby the background potentials $V_D$ become BK=−600 V, M=−530 V, C=−500 V and Y=−480 V and image distortion resulting from the discharge phenomenon may be prevented. Besides, background fog, which can be generated more easily by decrease in $V_D$, is made less conspicuous by selecting BK, for which background fog is most noticeable, as the first color and Y for which the background fog is least noticeable, as the last (fourth) color.

In the present embodiment, M and C images may be formed in an arbitrary order.

(Third Embodiment)

In the foregoing embodiments, weak exposure is executed for a color, in the image area in which such color is not used. However, the color used in the image formation is used in various levels from a solid image to a pale halftone. Consequently, in executing weak exposure for a color not used inb an image formation, if color used in the image formation becomes thinner or more pastel, such pale image may be detrimentally affected when background fog of a color not used in the image formation is elevated by weak exposure.

The present embodiment avoids such a drawback by selecting the maximum density (largest light emission data) for each dot of the colors used for the image formation and not executing weak exposure of a color not used in the image formation if such maximum density does not reach a predetermined value.

This is based on a fact that image distortion resulting from discharge at a primary discharge becomes less conspicuous so that weak exposure may be dispensed with, when the toner (density) of an image is so low that it is influenced by the background fog of another color. However, in the execution of the present embodiment or the foregoing embodiment 1 or 2, it is preferable to clearly define the form of each pixel or the growth thereof in forming a halftone image, by adopting larger pixels as shown in FIG. 7B instead of the pattern shown in FIG. 7A for the color used for the image formation (for example, constituting a pixel with 4×4 dots). On the other hand, for the purpose of reducing $V_D$ using weak exposure, it is preferable to reduce $V_D$ in a uniform manner as if by a broad lamp exposure rather than in discrete dots, so that the weak exposure is preferably executed not through a dither matrix or the like but by pulse width modulation for each minimum dot (600 dpi in the present embodiment) as shown in FIG. 6C. Therefore, when determining whether or not to execute weak exposure for a color not used in an image formation by selecting the maximum density among the colors used in the image formation, the density data for a color used in the image formation should be the original image data, as shown in FIG. 7A (having density data in the unit of 600 dot/inch for each color) prior to the development into the dither matrix.

As an example, weak exposure is executed when the density data for a color used in an image formation is equal to or higher than a level 48 (corresponding to a reflective density of about 0.3 in the image), but is not executed when the density data is less than such level. Thus, image distortion resulting from discharge can be prevented in the image area of higher density, and in the image area of lower density, the image is not influenced by the background fog of a color not used in the image formation and image distortion caused by discharge is retained in a practically completely acceptable level.

Also, instead of determining whether or not to execute weak exposure using a threshold value, it is also possible to continuously vary the amount of the weak exposure according to the density of the color used in the image formation.

In the foregoing first to third embodiments there has been explained a configuration of employing the intermediate transfer belt 51 and executing four developments in succession on a photosensitive drum, but an intermediate transfer drum may be employed instead of the intermediate transfer belt, and the present invention is likewise applicable also to a one-pass system employing four photosensitive members for transferring images in one pass onto an intermediate transfer member, instead of transferring the images in succession from a single photosensitive member.

According to the present invention, as explained in the foregoing, if a color not used in the image formation is present in an area containing at least a color to be formed, a weak exposure of a level substantially not generating a visible image by the developing means is executed for at least a color not used in the image formation, and is executed either constantly or according to the density of the color used in the image formation or to the exposure data related thereto, thereby preventing image distortion resulting from discharge in air when passing the primary transfer area, and also preventing a drawback such as background fog caused by such weak exposure.

The present invention is not limited to the foregoing embodiments but is subject to various modifications within the scope and spirit of the appended claims.

What is claimed is:

1. An image forming apparatus, comprising:

a photosensitive member;

charging means for charging said photosensitive member;

exposure means for exposing said photosensitive member with an image light modulated in accordance with an image signal;

developing means for selectively developing a latent image formed on said photosensitive member with toner of one of plural colors to form a toner image; and an image holding member for temporarily holding a toner image transferred from said photosensitive member, wherein said image holding member is operable to receive in succession and superposed one on another a plurality of toner images of plural colors formed on said photosensitive member, and to hold said plurality of superposed toner images of plural colors simultaneously, and wherein said exposure means is operable, in exposing said photosensitive member in accordance with the image signal, to expose a pixel not exposed in accordance with the image signal with a faint light.

2. An image forming apparatus according to claim 1, wherein when a pixel exposed on said photosensitive member in accordance with an image signal for a first color is not exposed on said photosensitive member in accordance with an image signal for a second color, said exposure means exposes the pixel with a faint light.

3. An image forming apparatus according to claim 1, wherein when a pixel is not exposed on said photosensitive member in accordance with an image signal for a first color, and subsequently is exposed on said photosensitive member in accordance with an image signal for a second color, said exposure means exposes the pixel with a faint light.

* * * * *

UNITED STATES PATENT AND TRADEMARK OFFICE
CERTIFICATE OF CORRECTION

PATENT NO. : 6,144,817
DATED : November 7, 2000
INVENTOR(S) : Akihiko Takeuchi et al.

It is certified that error appears in the above-identified patent and that said Letters Patent is hereby corrected as shown below:

Column 1,
Line 17, "image," should read -- image --.
Line 18, "drum," should read -- drum --.
Line 19, "the" should be deleted.
Line 25, "the" should read -- an --.
Line 44, "a toner image" should read -- toner images --.

Column 2,
Line 18, "of" (first occurrence) should read -- having --.
Line 22, "with" should read -- having --.
Line 23, "a" should be deleted.
Line 39, "the" (first occurrence) should read -- an --.
Line 46, "being" should be deleted.
Line 47, "scattered" should read -- scattering --.
Line 49, "the" should read -- a --.

Column 3,
Line 57, "the" should be deleted.
Line 58, "reversal" should read -- reverse --.

Column 5,
Line 24, "the" (both occurrences) should be deleted.
Line 40, "developing" should be -- developer --.
Line 57, "sal" should read -- se --.
Line 63, "is" should be deleted.

Column 6,
Line 14, "by" should read -- using --.
Line 16, "seamless" should read -- seamlessly --.
Line 17, "of" (first occurrence) should read -- having --.
Line 22, "thus" should read -- the thus --.
Line 24, "of" should read -- having a --.
Line 53, "transfer" should read -- transfer, --.

UNITED STATES PATENT AND TRADEMARK OFFICE
CERTIFICATE OF CORRECTION

PATENT NO.    : 6,144,817
DATED         : November 7, 2000
INVENTOR(S)   : Akihiko Takeuchi et al.

It is certified that error appears in the above-identified patent and that said Letters Patent is hereby corrected as shown below:

Column 8,
Line 17, "having" should read -- having a --.

Column 10,
Line 55, "by" should read -- by a --.
Line 67, "inb" should read -- in --; and "color" should read -- a color --.

Signed and Sealed this

Twenty-sixth Day of February, 2002

Attest:

JAMES E. ROGAN
*Attesting Officer*    *Director of the United States Patent and Trademark Office*